United States Patent
Schnebly

(10) Patent No.: US 8,165,226 B2
(45) Date of Patent: Apr. 24, 2012

(54) IMAGING FRAME FREEZE DETECTION

(75) Inventor: Dexter A. Schnebly, Wichita, KS (US)

(73) Assignee: The Boeing Company, Chicago, IL (US)

( * ) Notice: Subject to any disclaimer, the term of this patent is extended or adjusted under 35 U.S.C. 154(b) by 1160 days.

(21) Appl. No.: 11/951,417

(22) Filed: Dec. 6, 2007

(65) Prior Publication Data

US 2009/0147861 A1 Jun. 11, 2009

(51) Int. Cl.
*H04N 7/12* (2006.01)
*H04N 9/64* (2006.01)

(52) U.S. Cl. .............. 375/240.27; 375/240.26; 348/715

(58) Field of Classification Search .................. None
See application file for complete search history.

(56) References Cited

U.S. PATENT DOCUMENTS

| | | | |
|---|---|---|---|
| 2004/0091050 A1* | 5/2004 | Choi et al. | 375/240.18 |
| 2006/0059349 A1* | 3/2006 | Roberts | 713/176 |
| 2006/0153296 A1* | 7/2006 | Deng | 375/240.12 |
| 2006/0236200 A1 | 10/2006 | Tanaka et al. | |
| 2009/0252370 A1* | 10/2009 | Picard et al. | 382/100 |

FOREIGN PATENT DOCUMENTS

| | | |
|---|---|---|
| GB | 2 377 107 | 12/2002 |
| GB | 2 451 436 | 2/2009 |

OTHER PUBLICATIONS

UK Combined Search and Examination Report in GB Application No. 0822277.0 dated Apr. 1, 2009; 3 pages.

* cited by examiner

*Primary Examiner* — Marcus R Smith
(74) *Attorney, Agent, or Firm* — Hope Baldauff Hartman, LLC

(57) ABSTRACT

Techniques for detecting faults in a digital video stream include frame freeze detection that can alert an operator of frame freeze in a digital video stream. According to various embodiments, a counter or other code generator is used to place a code into each frame of a video stream. The code counts sequentially, or otherwise changes in a predetermined manner, from one frame to the next and is embedded into one or more pixels of each frame. Verification at the destination, or display, of the changing code within the frames of the video stream can confirm that the video stream is not in a frame freeze fault condition prior to display. If a fault condition is detected by the code verification process, an operator can be made aware of the fault.

12 Claims, 4 Drawing Sheets

IMAGING FRAME FREEZE DETECTION

TECHNICAL FIELD

This application relates generally to digital video, and more specifically to embedding a changing series of numbers within the frames of a digital video stream to detect various system failure conditions.

BACKGROUND

Digital video systems generally communicate a sequence of digital images from a source, such as a camera, to a destination, such as a display. The communication can be directly from a camera to a live display or the communication can be time delayed by storing the video and displaying it at a later time. The digital images may be compressed or communicated in their native format.

Various system failures within a digital video system may cause the sequence of images to stop, or to lock-up, resulting in a frame freeze condition. Examples of such failures may be camera lock-up, electronics lock-up, communications fault, storage failure, repeated frames, skipped frames, or partial frames. In some critical applications, it is important for an operator to know quickly that the video system has failed. This may be especially true where a static image on the operator's display may cause the operator to erroneously conclude that scene at the source is simply not changing, when in fact the video system is not operating properly. Some examples of critical applications are security monitoring, medical monitoring, military surveillance, navigation, or manufacturing system tracking.

Attempts to ensure against video system frame freeze have included calculating a checksum, or cyclic redundancy check (CRC) value for each frame at the receiver to determine if it is different than the previous frame. If the calculated value changed from frame to frame, then it could be assumed that the video was not frozen. Calculating such values over the entire two dimensional array of a video frame can be computationally complex and may consume considerable computer time and computer power. Additionally, there may be instances where the image actually did not change, such as a still portion of a video, which may result in the checksum value or CRC value remaining unchanged between frames. Also, two rather different video frames may just happen to have the same checksum value or CRC value which could result in false indications of video system lock-up.

It is with respect to these considerations and others that the disclosure made herein is presented.

SUMMARY

Technologies are described herein for detecting faults in a digital video stream such as repeated, skipped, stopped or partial frames. Through the utilization of the technologies and concepts presented herein, frame freeze detection can alert an operator of frame faults in a digital video stream. Embodiments described below provide a counter or other code generator at the camera, or video source, to place a code into each frame of the video. The code can count, or otherwise change, from one frame to the next. Verification at the destination, or display, of the changing code within the frames of the video stream confirms that the video stream is not in a fault condition. If a fault condition is detected by the code verification process, an operator can be made aware of the fault. Extracting and verifying a sequential code can be a much more efficient operation than calculating a checksum or CRC over each frame of a video stream.

According to various embodiments presented herein, a sequential code is generated using a roll-over counter, or a more complex deterministic function or algorithm. The code is embedded into one or more pixels of a video frame with each subsequent frame of the video containing the next value in the code sequence. These codes can be embedded in place of the color codes for one or more pixels of each frame. Using edge or corner pixels may reduce the visual impact of changing the color codes of the pixels where the code is embedded. For example, the upper left-hand corner pixel and lower right-hand corner pixel may be replaced with the sequential code. Other selections of edge, or corner pixels, or even any other pixel may be used to embed the codes.

According to other embodiments, a method to detect a fault in a digital video signal includes acquiring a sequence of video frames, generating a sequence of code values corresponding to the sequence of video frames, and then embedding the sequence of code values into the sequence of video frames. The sequence of video frames with the embedded code values is transmitted to a destination where the sequence of code values is extracted. A second sequence of code values is generated at the destination and then compared with the extracted code values. A fault indication is presented when the comparison does not match and the video frames are displayed when the comparison does match.

The features, functions, and advantages that have been discussed can be achieved independently in various embodiments of the present invention or may be combined in yet other embodiments, further details of which can be seen with reference to the following description and drawings.

DETAILED DESCRIPTION

Figure 1B:
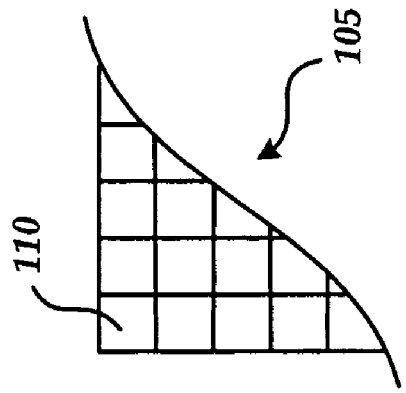
FIG. 1B is a video display close-up illustrating a frame freeze detection display according to embodiments described herein.

The following detailed description is directed to technologies for video frame freeze detection. Through the use of the embodiments presented herein, video frame freeze conditions in digital video systems may be detected and indicated to an operator.

While the subject matter described herein is presented in the general context of program modules that execute in conjunction with a computer system, one having ordinary skill in the art will recognize that other implementations may be performed in combination with other types of program modules. Generally, program modules include routines, programs, components, data structures, and other types of structures that perform particular tasks or implement particular abstract data types. Moreover, one having ordinary skill in the art will appreciate that the subject matter described herein may be practiced with other computer system configurations, including hand-held devices, multiprocessor systems, microprocessor-based or programmable consumer electronics, minicomputers, mainframe computers, and the like.

As mentioned above, it is important to be able to detect a video frame freeze and to differentiate between a system failure and an unchanging scene. Embodiments described below provide a sequential code that is embedded within one or more pixels of each video frame at the video source. These sequential code values are extracted at the destination and compared against the expected code values. If the extracted codes progress as expected, then the video system is not in a frame freeze fault condition. These embodiments provide an advantage over conventional checksum frame freeze detection methods due to a dramatic reduction in required computing complexity and computer power.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for digital video frame freeze detection will be described.

Figure 1A:
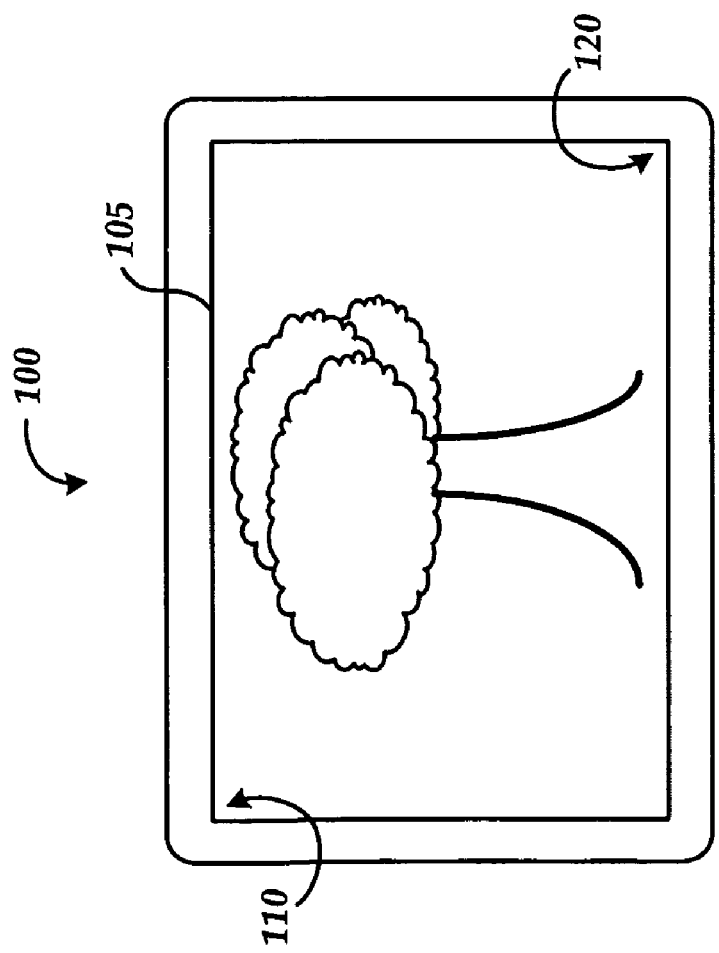
FIG. 1A is a video display system diagram illustrating a frame freeze detection display according to embodiments described herein.

Turning first to FIG. 1A-1B, details will be provided regarding an illustrative video display system for frame freeze detection. In particular, FIG. 1A is a video display system diagram illustrating a frame freeze detection display according to various embodiments. A single frame 105 of a video stream is presented on a video display 100. A sequence of frames 105 make up the digital video stream. Each frame 105 may be considered a bitmap or an arrangement of digital picture elements, or pixels. For example, each frame 105 may be a grid of colored pixels. The first pixel 110 in the grid of pixels may be in the upper left-hand corner of the frame 105 and thus appears in the upper left-hand corner of the video display 100. The last pixel 120 in the grid of pixels may be in the lower right-hand corner of the frame 105 and thus appears in the lower right-hand corner of the video display 100.

The first pixel 110, and optionally the last pixel 120, may be used when embedding a frame freeze detection code according to the embodiments described herein. The first pixel 110 and the last pixel 120 are notable options for code embedding because they are simple to extract and their location within a frame 105 causes them to be less visually relevant. That is, changes in these corner pixels are less noticeable to the observer then pixels in the center of the frame 105 may be. For similar reasons, other corner or edge pixels may be selected for code embedding. However, non-edge or non-corner pixels may be also used for code embedding. In fact, any pixel, or collection of pixels may be used for code embedding without departing from the scope of this disclosure.

FIG. 1B is a video display close-up illustrating a portion of a frame freeze detection display according to various embodiments. A single frame 105 of a video stream is magnified to emphasize the upper left-hand corner of the frame 105. From this magnified view, some of the individual pixels can be seen. The first pixel 110 in the grid of pixels is in the upper left-hand corner of the frame 105. As discussed above, the first pixel 110, or any other pixels, may be used for embedding a frame freeze detection code.

Figure 2:
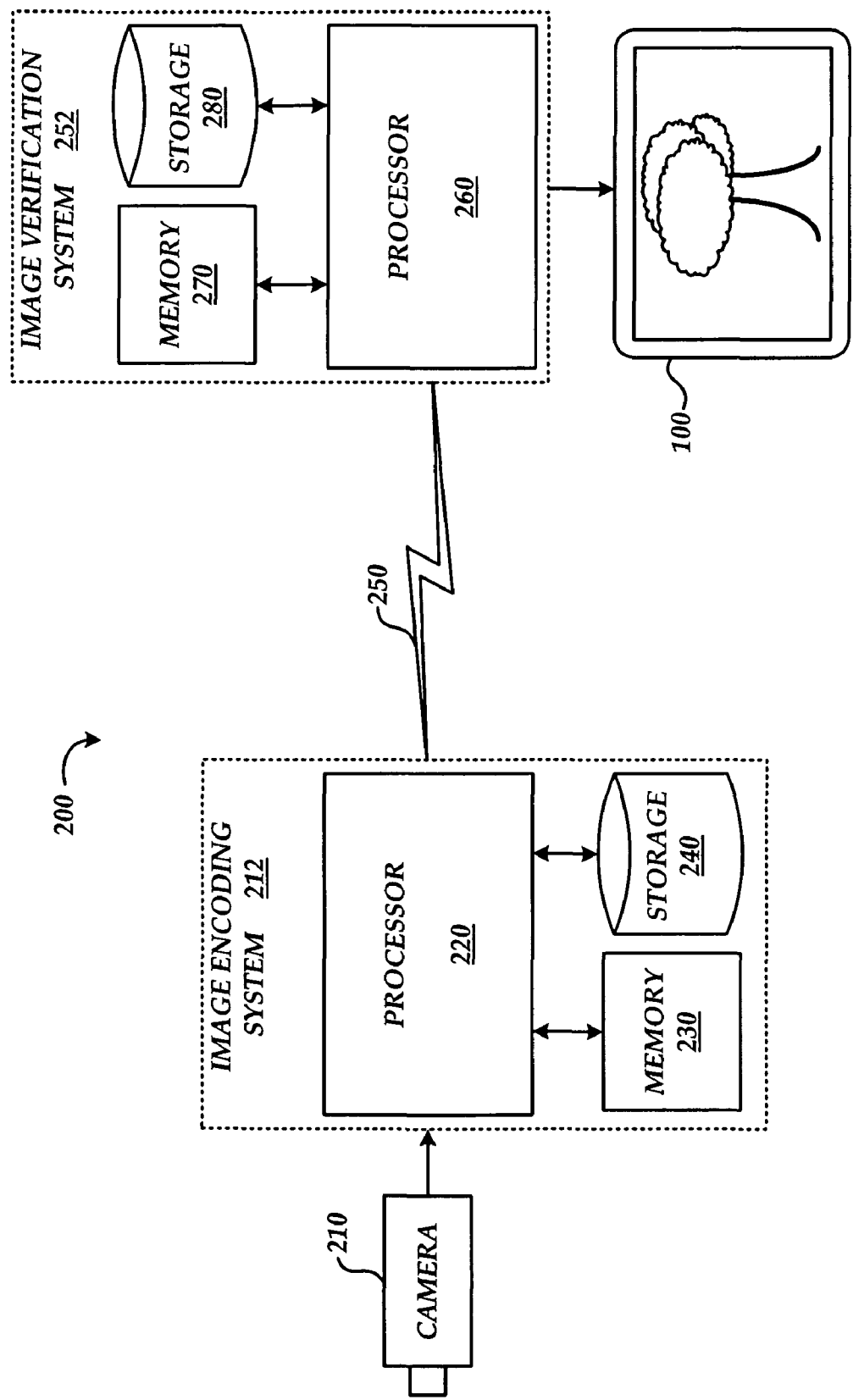
FIG. 2 is a functional block diagram illustrating a frame freeze detection system according to embodiments described herein.

Referring now to FIG. 2, additional details will be provided regarding the embodiments presented herein for frame freeze detection. In particular, FIG. 2 is a functional block diagram illustrating a frame freeze detection system 200 according to embodiments described herein. The frame freeze detection system 200 includes a camera 210, image encoding system 212, image verification system 252, and a video display 100. The camera 210 is used to capture source video. The camera 210 may be any kind of conventional camera capable of capturing and transmitting video data that includes sequential video frames 105. Examples include but are not limited to a digital charge coupled device (CCD) based camera, an infrared camera, a night vision camera, or any other type of image acquiring device. The camera 210 may have switches or other configuration setting mechanisms for configuring or manipulating aspects of the embodiments described herein. For example, the camera 210 may have a switch to turn on (and off) the code embedding mechanism. The camera 210 may have another switch or configuration setting to select the pixel(s) of each frame (such as the upper left-hand pixel) where the code values are to be embedded.

Each frame of the source video is encoded to include embedded sequential code values within one or more pixels by the image encoding system 212. It should be appreciated that the image encoding system 212 may be a part of the camera 210, or may be located within a computer system that is directly, or remotely, connected to the camera 210. The image encoding system 212 may include a source processor 220, memory 230, and storage 240.

The source processor 220 can be a microprocessor, a microcontroller, a digital signal processor (DSP), an application specific integrated circuit (ASIC), a field programmable gate array (FPGA), or any other type of digital controller system or digital processor system. According to one embodiment, the memory 230 is used for buffering images and video from the camera 210, while the storage 240 contains code to be executed by the source processor 220. The storage 240 includes computer storage media such as a magnetic or optical disk, volatile memory such as random access memory (RAM), non-volatile memory such as a read only memory (ROM), programmable read only memory (PROM), erasable PROM (EPROM), or FLASH memory, or any other storage media. The memory 230 may be volatile or non-volatile memory and may be included as part of the storage 240 or exist independently from the storage 240.

The source processor 220 executes coded instructions, and/or hardwired electronic operations to encode pixels from the camera 210 with frame detection codes. The video frames 105 containing the coded pixels can be communicated over a communication link 250 to a display processor 260. The communication link 250 may be wireless, wired, satellite, or optical. The communication link 250 may additionally be real-time, buffered, or store-and-forward in nature. The communication link 250 can be a single link, or a network of multiple links such as a local area network (LAN), wide area network (WAN), metropolitan area network (MAN), the Internet, intranet, public switched telephone network (PSTN), or any combination thereof. Furthermore, the communication link 250 may use any protocol such as Ethernet, asynchronous transfer mode (ATM), synchronous optical network (SONET), X.25, global system for mobile (GSM), code division multiple access (CDMA), high-level data link control (HDLC), packet switched, streaming, cellular, mobile ad hoc, or otherwise.

The image verification system 252 receives the encoded video from the image encoding system 212 and utilizes the embedded codes to verify video image continuity and detect frame freeze when it occurs. The image verification system 252 may include a display processor 260, memory 270, and storage 280. The display processor 260 executes coded instructions, and/or hardwired electronic operations to extract and verify frame freeze detection codes from video frames 105 received via the communication link 250. The display processor 260 can be a microprocessor, a microcontroller, a DSP, an ASIC, an FPGA, or any other type of digital controller system or digital processor system.

According to one embodiment, the memory 270 is used for buffering images and video, while the storage 280 contains code to be executed by the display processor 260. The storage 280 includes computer storage media such as a magnetic or optical disk, volatile memory such as RAM, non-volatile memory such as a ROM, PROM, EPROM, or FLASH memory, or any other storage medium. The memory 270 can be volatile memory such as RAM or non-volatile memory such as ROM, PROM, EPROM, or FLASH memory, and may be included as part of the storage 280 or exist independently from the storage 280. It should be appreciated that the image verification system 252 may be part of the video display 100, or may be located within a local or remote computer system that is associated with the video display 100.

The display processor 260 extracts and verifies frame freeze detection codes from each video frame 105. The verification process includes generating a local version of the next expected code and comparing it with the code extracted from the received video frame 105. When the frame freeze detection code extracted from a frame matches the expected code, then the video stream is not frozen and the frame 105 may be presented on the video display 100. Otherwise, when the codes do not match, a fault indication may be presented to the operator using the video display 100, a lamp, LED, siren, buzzer, or other indicator of system fault.

Figure 3:
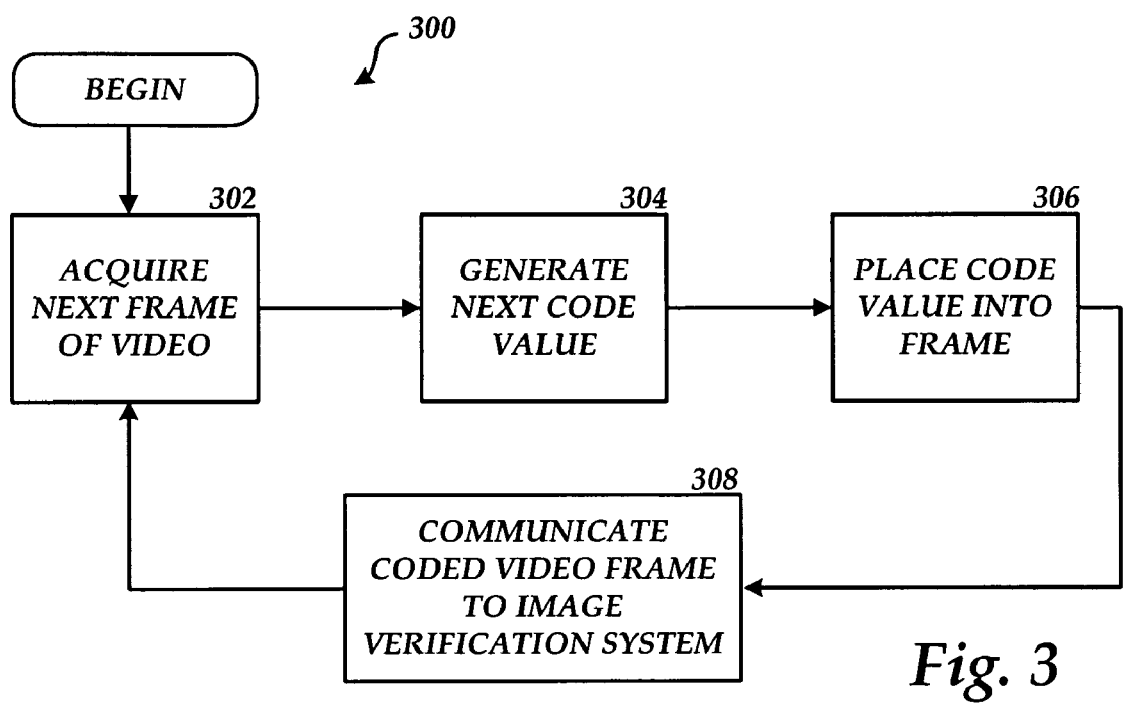
FIG. 3 is a logical flow diagram illustrating a process for incorporating a frame freeze detection code into a digital video stream according to embodiments described herein.

Turning now to FIG. 3, additional details will be provided regarding the embodiments presented herein for frame freeze detection. In particular, FIG. 3 is a flow diagram showing a routine 300 for incorporating a frame freeze detection code into a digital video stream according to embodiments described herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 300 begins with operation 302 where a frame 105 of a video stream is acquired from the camera 210 by the image encoding system 212. As described above, the image encoding system 212 may reside within the camera 210, or in a computer system directly or remotely connected to the camera 210. From operation 302, the routine 300 continues to operation 304, where the image encoding system 212 generates the next frame freeze code value. The frame freeze code generator may be a simple counter, such that the code embedded into one frame 105 is simply one value greater than the code embedded into the previous frame 105. The code can also be generated by any other deterministic mechanism or algorithm. For example, the code can count by two, or five, or some other value. The code can count forward or backwards.

The code may be the output of a linear shift register, or a linear feedback shift register. The code may be a single value or a vector of values.

The routine 300 proceeds to operation 306, where the image encoding system 212 inserts the next frame freeze code value that was generated in operation 304 into the video frame 105. The code may be inserted into a single pixel or multiple pixels of the video frame 105. The code can spread across a group of neighboring pixels or across a group of distant pixels. According to various embodiments, the code may entirely replace the value of the pixel. For example, the code may replace the red-green-blue (RGB) color codes of the pixel. Alternatively, the code can be applied as a perturbation to the value of a pixel or a group of pixels.

From operation 306, the routine 300 continues to operation 308, where the frame 105 with the encoded pixels from operation 306 is transmitted to the image verification system 252 via the communication link 250. The complimentary receive functionality of this transmission operation is described in more detail with respect to FIG. 4. After operation 308, the routine 300 returns to operation 302 to acquire the next video frame 105 and continues as described above.

Figure 4:
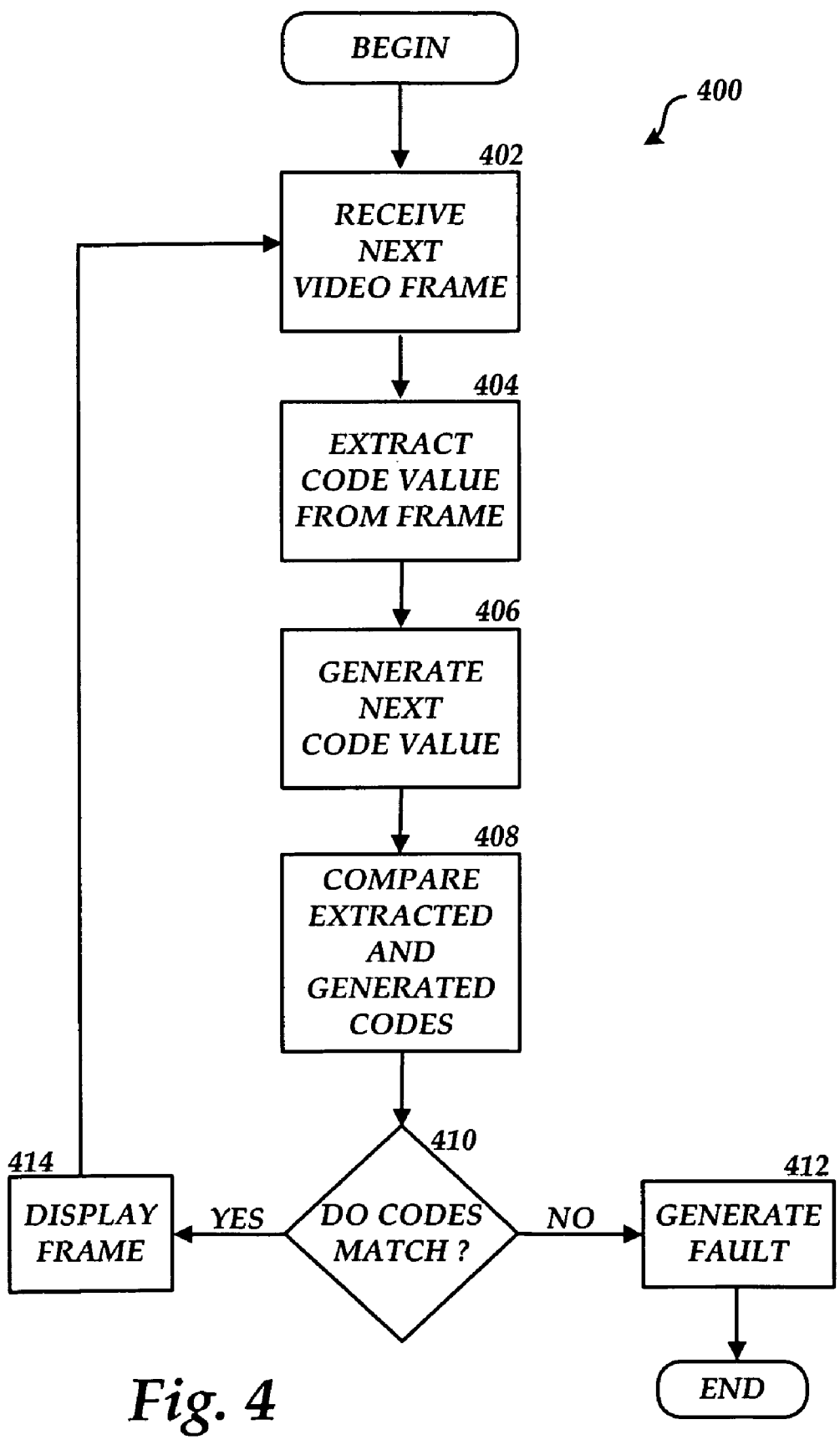
FIG. 4 is a logical flow diagram illustrating a process for extracting and evaluating frame freeze detection codes from a digital video stream according to embodiments described herein.

Turning now to FIG. 4, additional details will be provided regarding the embodiments presented herein for frame freeze detection. In particular, FIG. 4 is a flow diagram illustrating a routine 400 for extracting and evaluating a frame freeze detection code from a digital video stream according to embodiments described herein. The routine 400 begins with operation 402, where a video frame 105 from the image encoding system 212 is received at the image verification system 252. At operation 404, the frame freeze code value is extracted from the frame 105 that was received at operation 402. The frame freeze code value should be extracted from the frame in the same manner as it was encoded into the frame in operation 306.

The routine 400 continues from operation 404 to operation 406, where the image verification system 252 generates the next expected frame freeze code value to be compared to the frame freeze code value embedded within the received frame. The code generation technique should mirror that of the code generation performed at operation 304. At operation 408, the extracted code from operation 404 and the code generated in operation 406 are compared. From operation 408, the routine 400 continues to operation 410, where the image verification system 252 evaluates the outcome of the comparison from operation 408. If the extracted code matches the expected code, then it is reasonable to conclude that the video stream is not frozen or locked-up. If the extracted code does not match the expected code, then it can be concluded that there is some type of system fault.

If there is a fault concluded at operation 410, the routine 400 proceeds to operation 412 where a fault condition is generated and presented to the operator and the operation 400 ends. However, if there was no fault concluded at operation 410, then the routine 400 proceeds to operation 414, where the frame 105 is displayed on the video display 100. Optionally, the coded pixels may be removed prior to displaying the frame. For example, according to various embodiments, the coded pixels can be turned to black or replaced with the average value of surrounding pixels, or the average pixel value of the frame. After operation 414, the routine 400 returns to operation 402 to receive the next frame 105 and continues as described above.

Based on the foregoing, it should be appreciated that technologies for video frame freeze detection are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method to detect a fault in a digital video signal, comprising:
   generating a sequence of code values;
   embedding the sequence of code values into a sequence of video frames by modifying only a corner pixel within each sequential frame of the sequence of video frames by replacing a color code of the corner pixel within each sequential frame of the sequence of video frames with a sequential code value of the sequence of code values;
   transmitting the sequence of video frames to a destination;
   extracting the sequence of code values from the sequence of video frames at the destination;
   verifying the extracted sequence of code values; and
   presenting a fault indication when verification fails.

2. The method of claim 1, wherein generating the sequence of code values comprises generating a deterministic pattern of values.

3. The method of claim 1, wherein the corner pixel comprises an upper left corner position within each sequential frame of the sequence of video frames.

4. The method of claim 1, wherein the corner pixel comprises a lower right corner position within each sequential frame of the sequence of video frames.

5. The method of claim 1, wherein verifying the extracted sequence of code values comprises generating a sequence of verification values and comparing the extracted sequence of code values against the sequence of verification values, wherein the sequence of code values and the sequence of verification values are generated identically.

6. A non-transitory computer storage medium having computer-executable instructions stored thereon which, when executed by a computer system, cause the computer system to:
   generating a sequence of code values;
   embedding the sequence of code values into a sequence of video frames by modifying only a corner pixel within each sequential frame of the sequence of video frames by replacing a color code of the corner pixel within each sequential frame of the sequence of video frames with a sequential code value of the sequence of code values;
   transmit the sequence of video frames to a destination;
   extracting the sequence of code values from the sequence of video frames at the destination;
   verifying the extracted sequence of code values; and
   presenting a fault indication when verification fails.

7. The computer storage medium of claim 6, wherein generating the sequence of code values comprises generating a deterministic pattern of values.

8. The computer storage medium of claim 6, wherein the corner pixel comprises an upper left corner position within each sequential frame of the sequence of video frames.

9. The computer storage medium of 6, wherein the corner pixel comprises a lower right corner position within each sequential frame of the sequence of video frames.

10. The computer storage medium of claim 6, wherein verifying the extracted sequence of code values comprises generating a sequence of verification values and comparing the extracted sequence of code values against the sequence of verification values, wherein the sequence of code values and the sequence of verification values are generated identically.

11. A method to detect a fault in a digital video signal, comprising:
    acquiring a first sequence of video frames;
    generating a first sequence of code values;
    embedding the first sequence of code values into the first sequence of video frames modifying only a corner pixel within each sequential frame of the sequence of video frames by replacing a color code of the corner pixel within each sequential frame of the sequence of video frames with a sequential code value of the sequence of code values to generate a second sequence of video frames;
    communicating the second sequence of video frames to a destination;
    extracting the first sequence of code values from the second sequence of video frames at the destination;
    generating a second sequence of code values at the destination;
    comparing the extracted first sequence of code values with the second sequence of code values;
    presenting a fault indication when the extracted first sequence of code values does not match the second sequence of code values; and
    displaying the second sequence of video frames when the extracted first sequence of code values does match the second sequence of code values.

12. The method of claim 11, wherein the corner pixel comprises an upper left corner position within each sequential frame of the sequence of video frames with a sequential code value of the sequence of code values.

* * * * *